March 24, 1970    C. J. REYNOLDS    3,502,829
SAFETY WARNING ALARM

Filed March 20, 1967    2 Sheets-Sheet 1

INVENTOR.
CLAUDE J. REYNOLDS

United States Patent Office 3,502,829
Patented Mar. 24, 1970

3,502,829
SAFETY WARNING ALARM
Claude J. Reynolds, 620 Bundy Ave.,
San Jose, Calif. 95117
Filed Mar. 20, 1967, Ser. No. 624,534
Int. Cl. H01h 35/00
U.S. Cl. 200—61.24
1 Claim

ABSTRACT OF THE DISCLOSURE

This device relates to alarm signals in general, and in particular to a warning device which communicates a signal in response to undue loss of pressure in the pneumatic tire of a vehicle. As such, it finds particular utility in trailer vehicles, where the occurrence of flat tires is not usually manifest to the driver in the towing vehicle. Not only is this situation ruinous to tires, rims and wheels, but is also a hazard to human life and body injury, and other property.

---

This device which is simple in structure, low in cost, and easy of manufacture, maintenance, and reliability of performance. It is therefore an object of the invention to provide a signal device which operates in response to subnormal pressure in tires.

For a more detailed description of the invention, reference is made to the following specifications, as illustrated in the drawings in which.

DETAILED DESCRIPTION OF INVENTION

Figure 1:
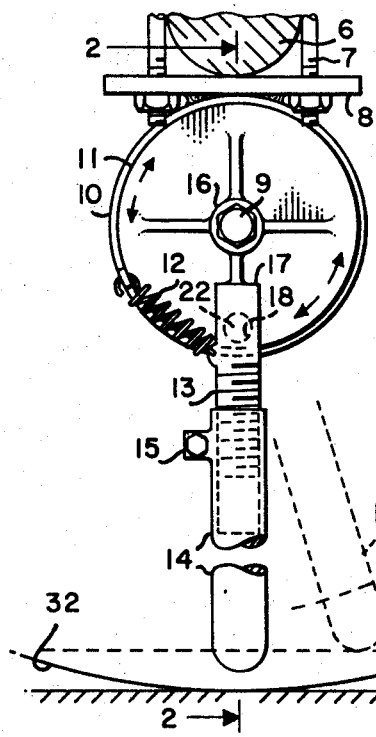
FIGURE 1 is the invention seen in elevation, showing the travel of the adjustable dragrod.
Figure 2:
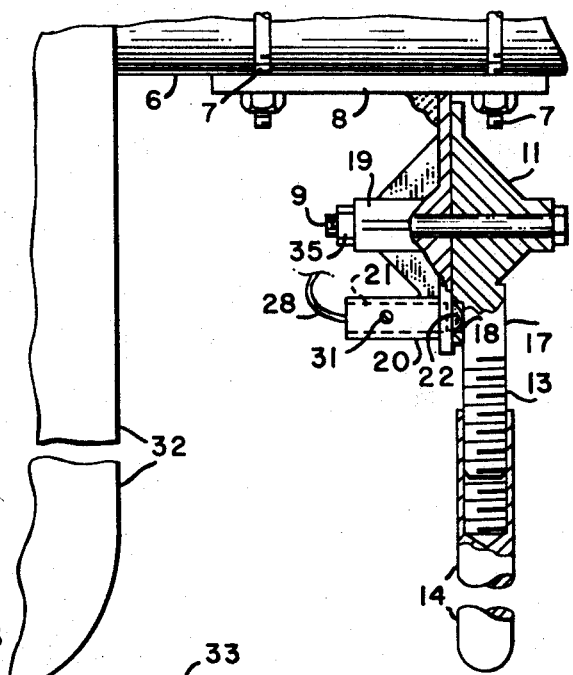
FIGURE 2 is seen in partial cross section, as taken along line 2—2 of FIGURE 1, showing complete assembly.
Figure 3:
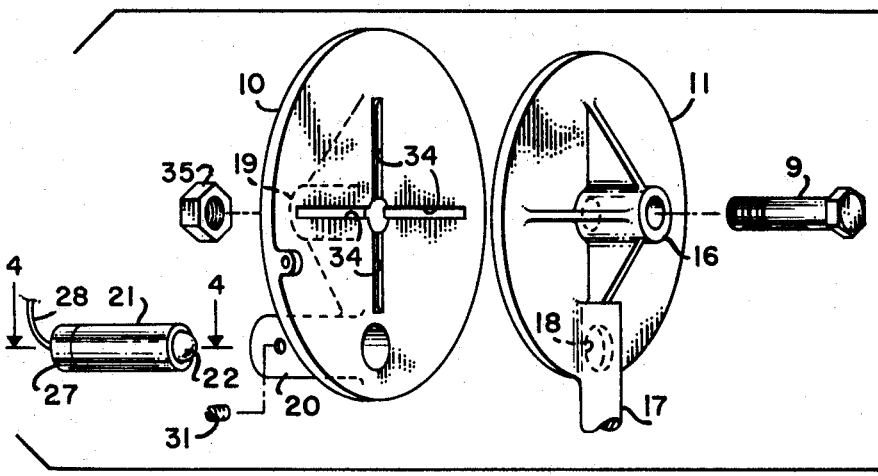
FIGURE 3 is an exploded view of present invention, showing how the invention is assembled.

Adjustable dragrod 14 as seen in FIGURE 1 is made in two parts, the upper half 13 and the lower part 14. Part 13 is screwed into part 14. When adjusted to proper length, the lower end of part 14 will be one half the thickness of the tire from the road. Example (if the tire is 6" thick the end of the adjustable dragrod would be 3" from the road, as seen in FIGURE 1, 32–33). When the adjustable dragrod is adjusted properly it is made fast by clamp 15. This adjustable dragrod will move both forward and backward. This prevents any damage of the invention, when backing up the trailer. The upper half 13 of the adjustable dragrod is screwed into housing 17, FIGURE 1, and controls the movement of movable disc 11. The stationary disc 10 is mounted on the axle 6, by mounting plate 8, and held fast by U bolt 7. Mounting plate 8 is a part of stationary disc 10. When mounted correctly it will be centered with line 2—2, FIGURE 1. Movable disc 11 and stationary disc 10 are held together by bolt 9 and adjusted by nut 35 to let movable disc 11 move freely, as seen in FIGURE 2. Switch housing 21 is inserted into switch assembly housing 20 and when in proper place is made fast by set screw 31. This lets steel ball 22 pass through stationary disc 10 and come to rest in seat 18 in movable disc 11, as seen in FIGURE 2. Stationary disc 10 shows oil grooves 34 to insure easy movement of movable disc 11, FIGURE 3.

Figure 4:
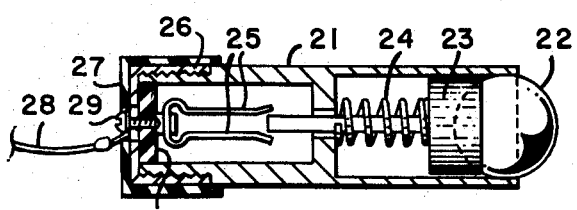
FIGURE 4 is a cross section of switch, as seen along line 4—4 of FIGURE 3, showing the assembly of switch.

When the trailer is being pulled on the highway by an automobile, and a tire becomes half deflated, the adjustable dragrod 14 comes in contact with the road. By the forward movement of the trailer, this causes the adjustable dragrod 14 to move backwards, as seen in FIGURE 1, 32–33. The adjustable dragrod 14 carries with it movable disc 11. This forces steel ball 22 from its seat 18 in movable disc 11. When steel ball 22 is moved backwards, it pushed follow head 23 backwards too. The follow head 23 is shaped on one end to fit steel ball 22 and the other end is shaped round, forming a plunger. This movement causes the plunger end of follow head 23 to make contact with contact fingers 25, closing the circuit. Screw 29 passes through the terminal eyelet electric wire 28, and through the nonconductor fiber disc 30 and screws into contact fingers base 25, as seen in FIGURE 4. Electric wire 28 runs to instrument panel of automobile and is connected to the drivers warning alarm. When the trailer is jacked up to change the tire, the reset spring 12 will move the movable disc 11 back to its proper place. Spring 24 pushes follow head 23 and steel ball 22 outward, forcing steel ball 22 to come to rest in seat 18 in movable disc 11. When follow head 23 is moved outwards this separates the follow head plunger 23 from contact fingers 25, thereby braking the electric circuit, as seen in FIGURE 4. Holding ring 26 is screwed on to the end of switch housing 21, to hold nonconductor fiber disc 30 in place. Rubber boot 27 is pushed over end of switch housing 21 to make it waterproof, as seen in FIGURE 4.

Figure 5:
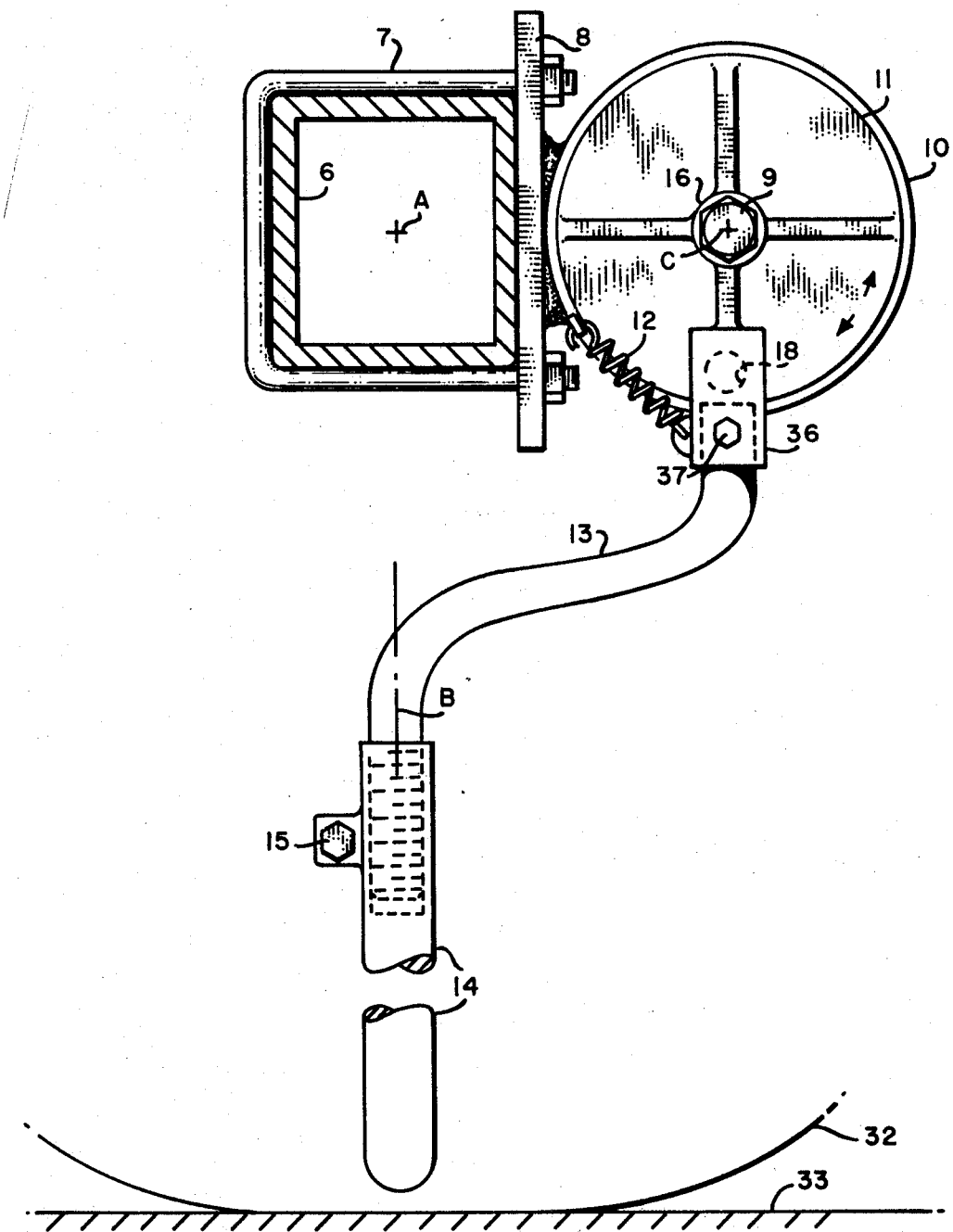
FIGURE 5 is modification of present invention, showing offset mounting that can be employed in present invention.

Some trailers use what is known as the drop type axle. This takes away some of the road clearance between the road and axle. In FIGURE 5 is shown some slight modifications. The mounting plate 8 is casted in a new place, 90° from the original place on stationary disc 10. Mounting plate 8 is mounted on the side of axle 6, and held fast by U bolt 7. In FIGURE 5, the adjustable dragrod upper half 13 is bent to an offset of 2" +½ the thickness of the axle 6. This puts the bottom half of adjustable dragrod 14 in proper place in line A to B. The adjustable dragrod 13 is made fast in adjustable dragrod housing 36, by U bolt 37. This insures that adjustable dragrod 13 will not move out of line, as seen in FIGURE 5.

I claim:

1. A vehicle tire pressure indicating and warning device comprising the combination of a bracket means, means demountably securing said bracket means to a member of the vehicle adjacent to a vehicle tire to be monitored, an electric switch housing attached to said bracket means, rotatable means attached by a pivot to said bracket means, rod shaped means depending from said rotatable means, said rod shaped means being adapted to engage the ground under said vehicle when said tire becomes deflated, said rod shaped means being adapted to be rotated when said vehicle is moved and said tire is deflated, a ball member positioned in the mouth of said switch housing and engaging said rotatable means in a recess when said rod shaped means depends from said rotatable means and is out of engagement with the ground, an electric switch in said switch housing, said electric switch having a stationary contact and a movable contact spring urged against said ball member, said ball member pressing said movable contact against said stationary contact when said rotatable means is rotated by said rod shaped means and said ball member is evicted from said recess, and an electrically energized warning circuit connected to said electric switch; said warning circuit being energized when said electric switch is closed.

References Cited

UNITED STATES PATENTS

| | | | |
|---|---|---|---|
| 2,442,956 | 6/1948 | Meroney | 200—61.24 |
| 2,673,261 | 3/1954 | Sellards | 200—61.24 |
| 2,741,673 | 4/1956 | Metcalf | 200—61.24 |
| 2,990,536 | 6/1961 | Pace | 200—61.24 |
| 3,072,759 | 1/1963 | Kreps | 200—61.24 |
| 3,265,822 | 8/1966 | Moulton | 200—61.24 |

HERMAN O. JONES, Primary Examiner